(12) United States Patent
Chen et al.

(10) Patent No.: US 11,337,103 B2
(45) Date of Patent: May 17, 2022

(54) BEARER PROCESSING METHOD AND SYSTEM, AND RELATED APPARATUS

(71) Applicant: Huawei Technologies Co., Ltd., Shenzhen (CN)

(72) Inventors: Zhongping Chen, Shanghai (CN); Han Zhou, Shanghai (CN); Aijin Jin, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 72 days.

(21) Appl. No.: 16/859,184

(22) Filed: Apr. 27, 2020

(65) Prior Publication Data
US 2020/0260316 A1     Aug. 13, 2020

Related U.S. Application Data

(63) Continuation of application No. 15/965,023, filed on Apr. 27, 2018, now Pat. No. 10,687,243, which is a
(Continued)

(51) Int. Cl.
*H04W 28/02* (2009.01)
*H04W 76/12* (2018.01)
(Continued)

(52) U.S. Cl.
CPC ......... *H04W 28/0252* (2013.01); *H04L 47/24* (2013.01); *H04L 69/22* (2013.01);
(Continued)

(58) Field of Classification Search
CPC ............. H04W 28/02; H04W 28/0205; H04W 28/0231; H04W 28/0236; H04W 28/0247;
(Continued)

(56) References Cited

U.S. PATENT DOCUMENTS 9,055,557 B1   6/2015 Bayar et al.
9,717,019 B2   7/2017 Duan et al.
(Continued)

FOREIGN PATENT DOCUMENTS

CN     101159567 A     4/2008
CN     101282511 A     10/2008
(Continued)

*Primary Examiner* — Kevin D Mew
(74) *Attorney, Agent, or Firm* — Slater Matsil, LLP

(57) ABSTRACT

A bearer processing method and system, and a related apparatus. A GW-U is configured to receive a data packet and match the data packet with a rule, and send bearer processing indication information to a GW-C if a rule matching result of the data packet meets a trigger condition for bearer processing, where the bearer processing indication information is used to trigger the GW-C to perform bearer processing according to quality of service QoS information of a data service corresponding to the data packet. The GW-C is configured to receive the bearer processing indication information from the GW-U, determine, according to the bearer processing indication information, the QoS information of the data service corresponding to the data packet, and perform bearer processing according to the QoS information of the data service corresponding to the data packet.

20 Claims, 9 Drawing Sheets

Related U.S. Application Data continuation of application No. PCT/CN2015/093038, filed on Oct. 28, 2015.

(51) Int. Cl.
    *H04L 69/22*     (2022.01)
    *H04L 47/24*     (2022.01)
    *H04W 28/24*     (2009.01)

(52) U.S. Cl.
    CPC ... *H04W 28/0247* (2013.01); *H04W 28/0268* (2013.01); *H04W 76/12* (2018.02); *H04W 28/24* (2013.01)

(58) Field of Classification Search
    CPC ......... H04W 28/0252; H04W 28/0268; H04W 28/24; H04W 76/10; H04W 76/12; H04L 47/24; H04L 69/22
    See application file for complete search history.

(56) References Cited

U.S. PATENT DOCUMENTS

| | | | |
|---|---|---|---|
| 2011/0103310 A1* | 5/2011 | Stojanovski | H04L 12/66 370/328 |
| 2011/0110350 A1 | 5/2011 | Lu et al. | |
| 2011/0270722 A1 | 11/2011 | Cai et al. | |
| 2012/0120831 A1* | 5/2012 | Gonsa | H04W 76/15 370/252 |
| 2012/0124220 A1* | 5/2012 | Zhou | H04M 15/8038 709/227 |
| 2012/0167179 A1* | 6/2012 | Evans | H04L 65/1016 726/4 |
| 2012/0327947 A1 | 12/2012 | Cai et al. | |
| 2013/0007257 A1* | 1/2013 | Ramaraj | H04L 63/0263 709/224 |
| 2013/0148605 A1* | 6/2013 | Jin | H04W 72/1242 370/329 |
| 2014/0016614 A1* | 1/2014 | Velev | H04W 76/38 370/331 |
| 2015/0063101 A1 | 3/2015 | Touati et al. | |
| 2015/0117347 A1 | 4/2015 | Iwai | |
| 2015/0139096 A1* | 5/2015 | Morioka | H04W 76/12 370/329 |
| 2015/0304865 A1 | 10/2015 | Poscher | |
| 2015/0373617 A1* | 12/2015 | Cho | H04W 40/12 370/329 |
| 2016/0127564 A1 | 5/2016 | Sharma et al. | |
| 2016/0014686 A1 | 6/2016 | Cho et al. | |
| 2016/0212668 A1* | 7/2016 | Castro Castro | H04L 47/20 |
| 2016/0234760 A1* | 8/2016 | Orlandi | H04W 48/14 |
| 2018/0249364 A1* | 8/2018 | Chen | H04W 76/22 |
| 2018/0279161 A1* | 9/2018 | Chen | H04M 15/66 |
| 2018/0295659 A1* | 10/2018 | Shan | H04W 76/12 |
| 2019/0116531 A1* | 4/2019 | Ryu | H04W 4/70 |
| 2019/0327658 A1* | 10/2019 | Han | H04W 36/0044 |
| 2019/0342785 A1* | 11/2019 | Li | H04W 28/0263 |
| 2020/0077315 A1* | 3/2020 | Jin | H04W 36/0022 |
| 2020/0260336 A1* | 8/2020 | Wu | H04W 28/24 |
| 2020/0329397 A1* | 10/2020 | Huang-Fu | H04W 28/0257 |
| 2020/0374765 A1* | 11/2020 | Zong | H04W 36/0066 |

FOREIGN PATENT DOCUMENTS

| | | |
|---|---|---|
| CN | 102325350 A | 1/2012 |
| CN | 103716775 A | 4/2014 |
| EP | 2773147 A1 | 9/2014 |
| WO | 2011085803 A1 | 7/2011 |

* cited by examiner

BEARER PROCESSING METHOD AND SYSTEM, AND RELATED APPARATUS

CROSS-REFERENCE TO RELATED APPLICATIONS

This application is a continuation of U.S. patent application Ser. No. 15/965,023, filed on Apr. 27, 2018, which is a continuation of International Application No. PCT/CN2015/093038, filed on Oct. 28, 2015. All of the afore-mentioned patent applications are hereby incorporated by reference in their entireties.

TECHNICAL FIELD

The present invention relates to the field of communications technologies, and in particular, to a bearer processing method and system, and a related apparatus.

BACKGROUND

In an evolved packet core (EPC), a general packet radio service (GPRS) tunneling protocol (GTP) bearer provides an end-to-end data service for a user.

In an end-to-end data service implementation process, service data flows (SDF) with different quality of service (QoS) attributes are aggregated in different bearers. Based on QoS attributes of the different bearers, a network provides differentiated services for the user.

Currently, in a bearer processing process, if QoS of a bearer cannot meet a service requirement, user equipment (UE) sends requested QoS information to a packet data network gateway (P-GW). The QoS information may be information such as a QoS class identifier (QCI) or an allocation/retention priority (ARP). Based on the QoS information provided by the UE, the P-GW manages the bearer, for example, creating a bearer, updating the bearer, or deleting the bearer, so that QoS of the bearer meets the service requirement.

In the foregoing bearer processing process, the UE initiates a resource request procedure. That is, the UE needs to have a capability of identifying a service data flow. If the UE cannot identify the service flow, the bearer processing process cannot be implemented.

SUMMARY

Embodiments of the present invention provide a bearer processing method and system, and a related apparatus, so as to resolve a problem that bearer processing is limited to a UE capability of identifying a service flow.

According to a first aspect, an embodiment of the present invention provides a bearer processing system that includes a gateway user plane GW-U and a gateway control plane GW-C. The GW-U is configured to receive a data packet and match the data packet with a rule, and send bearer processing indication information to the GW-C if a rule matching result of the data packet meets a trigger condition for bearer processing, where the bearer processing indication information is used to trigger the GW-C to perform bearer processing according to quality of service QoS information of a data service corresponding to the data packet. The GW-C is configured to: receive the bearer processing indication information sent by the GW-U, determine, according to the bearer processing indication information, the QoS information of the data service corresponding to the data packet, and perform bearer processing according to the QoS information of the data service corresponding to the data packet.

In the first aspect of the embodiment of the present invention, the GW-U matches the received data packet with the rule, and sends the bearer processing indication information to the GW-C if the matching result meets the trigger condition for bearer processing, so as to trigger the GW-C to perform bearer processing. That is, load interaction is implemented between the GW-C and the GW-U without a UE capability of identifying a service flow, thereby resolving a problem that bearer processing is limited to a difference between UE capabilities of identifying a service flow.

With reference to the first aspect, in a first implementation, the rule is a correspondence between the data service and the QoS information, and the rule is locally configured by the GW-U or obtained by the GW-U from the GW-C; the GW-U finds, from the rule, QoS information required for the data service corresponding to the data packet; and if the QoS information required for the data service is inconsistent with QoS information of a current bearer that is currently used for transmitting the data service, the trigger condition for bearer processing is met.

In an embodiment of the present invention, the QoS information required for the data service is inconsistent with the QoS information of the current bearer that is currently used for transmitting the data service when at least one of the following cases is satisfied. An allocation/retention priority ARP required for the data service is inconsistent with an ARP of the current bearer that is currently used for transmitting the data service. Alternately, a QoS class identifier QCI required for the data service is inconsistent with a QoS QCI of the current bearer that is currently used for transmitting the data service.

In an embodiment of the present invention, the bearer processing indication information sent by the GW-U may include the QoS information required for the data service, so that the GW-C can directly obtain the QoS information.

In an embodiment of the present invention, if each correspondence that is between a data service and QoS information and that is in the rule is corresponding to a rule identifier, the bearer processing indication information sent by the GW-U includes a rule identifier of a correspondence matching the data packet. Correspondingly, the GW-C may determine, according to the rule identifier, the QoS information of the data service corresponding to the data packet.

With reference to the first aspect, in a second implementation, the GW-C is further configured to send a subscription event to the GW-U, where the subscription event includes type information of a data service on which bearer processing needs to be performed; and the trigger condition is that the data packet matches the type information.

In an embodiment of the present invention, the GW-C determines, according to the bearer processing indication information, the QoS information of the data service in the following manner by determining, by the GW-C according to the bearer processing indication information, a data service type corresponding to the data packet; and allocating QoS according to the data service type, or receiving QoS that is sent by another network element device and that is allocated according to the data service type, where the another network element device is a network element device that is in an evolved packet core EPC and that is different from the GW-U and the GW-C.

In an embodiment of the present invention, the bearer processing indication information sent by the GW-U may include an application identifier, and the application identifier is used to identify a data service type matching the data packet, so that the GW-C determines the data service type according to the application identifier, and determines corresponding QoS.

In an embodiment of the present invention, if the type information description that is in the subscription event and that is of the data service on which bearer processing needs to be performed is corresponding to an event identifier, the bearer processing indication information sent by the GW-U may include an event identifier corresponding to type information description matching the data packet. Correspondingly, the GW-C may determine, according to the event identifier, the type information description that is of the data service and that is corresponding to the event identifier, and determine, according to the type information description that is of the data service and that is corresponding to the event identifier, the data service type corresponding to the data packet.

With reference to the first aspect of the present invention or any one of the foregoing implementations of the first aspect, the GW-U may further send packet feature information of the data packet to the GW-C, where the packet feature information is used by the GW-C to bind the data service corresponding to the data packet to a bearer; and the GW-C receives the packet feature information that is of the data packet and that is sent by the GW-U, and binds, according to the packet feature information, the data service corresponding to the data packet to the bearer.

In an embodiment of the present invention, the packet feature information is packet filtering information, and the packet filtering information includes some or all items of a service quintet of the data packet.

With reference to the first aspect of the present invention or any one of the foregoing implementations of the first aspect, the GW-C may further send rule update indication information to the GW-U, where the rule update indication information includes modified rule content, a modified rule identifier, and a bearer processing manner corresponding to the modified rule. The GW-U receives the rule update indication information sent by the GW-C, updates the rule according to the rule update indication information, and deletes a data service processing result associated with the modified rule, where the data service processing result is a result obtained by processing, by the GW-U, a data service corresponding to a data packet that meets the trigger condition for bearer processing.

With reference to the first aspect of the present invention or any one of the foregoing implementations of the first aspect, the GW-C may further send a traffic query request to the GW-U, where the traffic query request is used to instruct the GW-U to collect statistics about traffic of a specified bearer; receive a statistical result obtained by collecting, by the GW-U, statistics about the traffic of the specified bearer according to the traffic query request; and delete the specified bearer if it is determined, according to the statistical result, that accumulated traffic data of the specified bearer does not change at a specified time interval. Correspondingly, the GW-U receives the traffic query request sent by the GW-C, collects statistics about the traffic of the specified bearer according to the traffic query request, and sends the statistical result to the GW-C.

With reference to the first aspect of the present invention or any one of the foregoing implementations of the first aspect, the GW-U may further send end-of-data-service indication information to the GW-C. The GW-C receives the end-of-data-service indication information sent by the GW-U, and removes a data service indicated by the end-of-data-service indication information from a traffic flow template TFT of a bearer.

Specifically, in an embodiment of the present invention, the GW-U may further send QoS information of a deleted service flow to the GW-C. The GW-C receives the QoS information of the deleted service flow, and updates QoS information of a running bearer.

According to a second aspect, a gateway user plane GW-U is provided, including: a receiving unit, configured to receive a data packet; a processing unit, configured to: match the data packet received by the receiving unit with a rule, and control a sending unit to send bearer processing indication information to a gateway control plane GW-C if a rule matching result of the data packet meets a trigger condition for bearer processing, where the bearer processing indication information is used to trigger the GW-C to perform bearer processing according to quality of service QoS information of a data service corresponding to the data packet; and the sending unit, configured to send the bearer processing indication information to the GW-C.

In an embodiment of the present invention, the GW-U receives the data packet and matches the received data packet with the rule, and sends the bearer processing indication information to the GW-C if the matching result meets the trigger condition for bearer processing, so as to trigger the GW-C to perform bearer processing, thereby resolving a problem that bearer processing is limited to a difference between UE capabilities of identifying a service flow.

According to a third aspect, an embodiment of the present invention provides a gateway control plane GW-C, including: a receiving unit, configured to receive bearer processing indication information sent by a gateway user plane GW-U, where the bearer processing indication information is used to instruct the GW-C to perform bearer processing according to quality of service QoS information of a data service corresponding to a data packet; and a processing unit, configured to: determine, according to the bearer processing indication information received by the receiving unit, the QoS information of the data service corresponding to the data packet, and perform bearer processing according to the QoS information of the data service corresponding to the data packet.

According to a fourth aspect, a bearer processing method is provided, including: receiving, by a gateway user plane GW-U, a data packet; and matching, by the GW-U, the data packet with a rule; and sending, by the GW-U, bearer processing indication information to a gateway control plane GW-C if a rule matching result of the data packet meets a trigger condition for bearer processing, where the bearer processing indication information is used to trigger the GW-C to perform bearer processing according to quality of service QoS information of a data service corresponding to the data packet.

In an embodiment of the present invention, the GW-U matches the received data packet with the rule, and sends the bearer processing indication information to the GW-C if the matching result meets the trigger condition for bearer processing, so as to trigger the GW-C to perform bearer processing. That is, load interaction is implemented between the GW-C and the GW-U without a UE capability of identifying a service flow, thereby resolving a problem that bearer processing is limited to a difference between UE capabilities of identifying a service flow.

According to a fifth aspect, an embodiment of the present invention provides a bearer processing method, including: receiving, by a gateway control plane GW-C, bearer processing indication information sent by a gateway user plane GW-U, where the bearer processing indication information is used to instruct the GW-C to perform bearer processing according to quality of service QoS information of a data service corresponding to a data packet; determining, by the GW-C according to the bearer processing indication information, the QoS information of the data service corresponding to the data packet; and performing, by the GW-C, bearer processing according to the QoS information of the data service corresponding to the data packet.

In an embodiment of the present invention, the GW-C receives the bearer processing indication information sent by the GW-U, and performs bearer processing, so as to implement bearer processing by means of interaction between the GW-C and the GW-U, and resolve a problem that bearer processing is limited to a difference between UE capabilities of identifying a service flow.

DETAILED DESCRIPTION OF ILLUSTRATIVE EMBODIMENTS

The following clearly describes the technical solutions in the embodiments of the present invention with reference to the accompanying drawings in the embodiments of the present invention.

The "multiple" in the embodiments of the present invention means at least two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
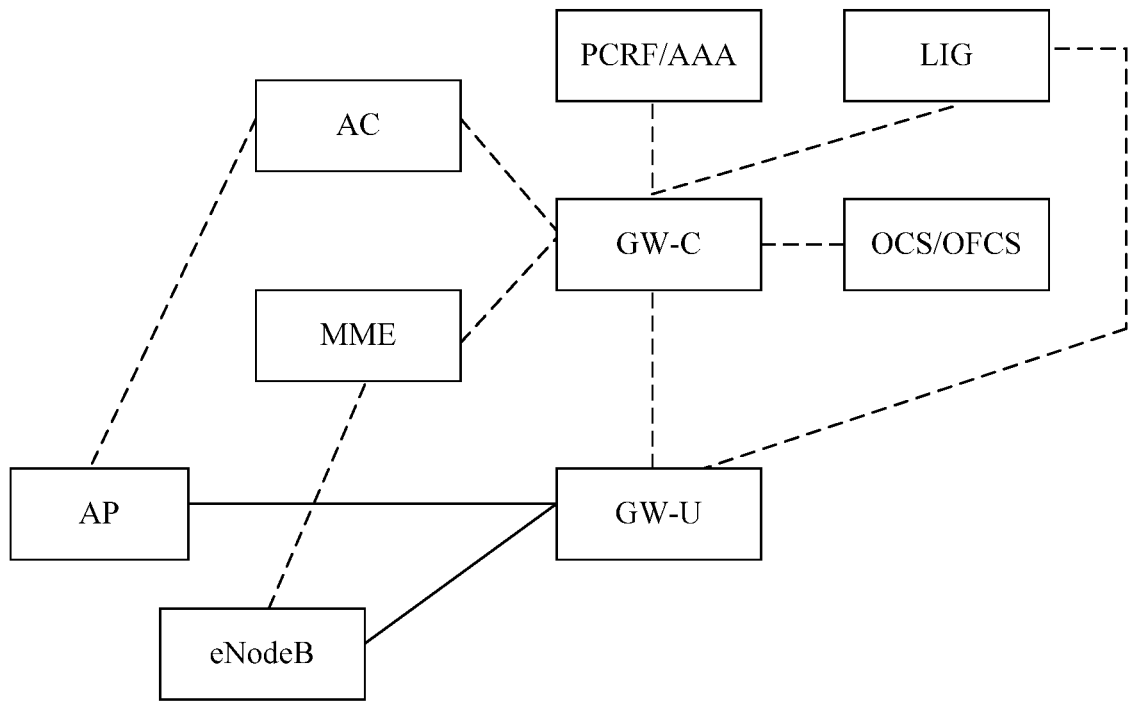
FIG. 1 is a diagram of a distributed gateway network architecture.

A distributed gateway (DGW) network architecture shown in FIG. 1 may be applied to a bearer processing method provided in the embodiments of the present invention. A gateway device in the DGW network architecture shown in FIG. 1 includes a distributed gateway control plane and a distributed gateway user plane. The distributed gateway control plane implements a function of the gateway control plane, and is referred to as a GW-C for short below. The distributed gateway user plane implements a function of the gateway user plane, and is referred to as a GW-U for short below.

The GW-C is a signaling control anchor, communicates with an access controller (AC), a mobility management entity (MME), a policy and charging rules function (PCRF), a lawful interception gateway (LIG), an online charging system (OCS), an offline charging system (OFCS), or the like, and may further define a processing action performed by the GW-U on a data packet. The GW-U is a processing anchor of a user data packet, communicates with an access point (AP), an evolved NodeB (eNodeB), or the like, and may implement local data exchange.

In the embodiments of the present invention, there is a communications interface between the GW-C and the GW-U. In the embodiments of the present invention, a name of the interface between the GW-C and the GW-U may be defined as S18. Certainly, another interface name is not limited. The GW-U may obtain a data packet of a data service. In the embodiments of the present invention, the GW-U determines whether the received data packet meets a condition for bearer processing. If the data packet meets the condition for bearer processing, the GW-U sends bearer processing indication information to the GW-C by using the S18 interface. The GW-C performs bearer processing according to the bearer processing indication information.

In the present invention, a process of implementing bearer processing by means of interaction between the GW-C and the GW-U is described in detail below.

Figure 2:
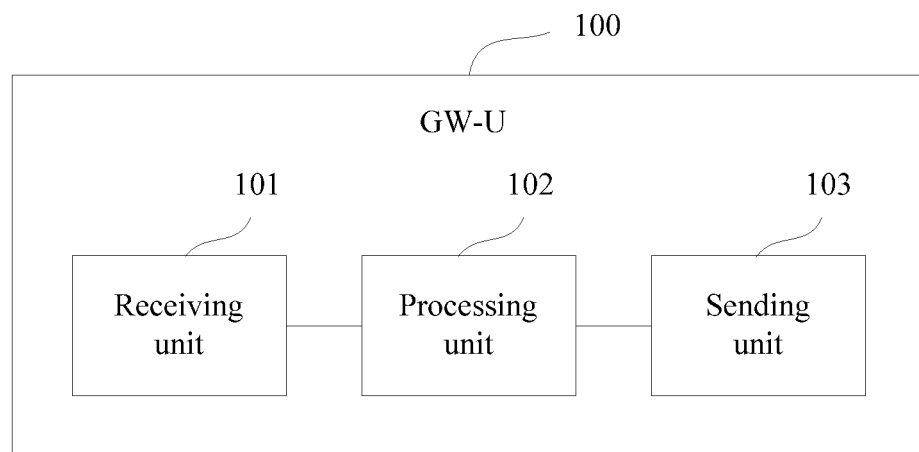
FIG. 2 is a schematic structural diagram of a GW-U according to an embodiment of the present invention.

The present invention provides a GW-U. FIG. 2 is a schematic structural diagram of the GW-U according to the present invention. In FIG. 2, a reference sign 100 is used to represent the GW-U. As shown in FIG. 2, the GW-U provided in the present invention includes a receiving unit 101, a processing unit 102, and a sending unit 103.

The receiving unit 101 is configured to receive a data packet.

The processing unit 102 is configured to: match the data packet received by the receiving unit 101 with a rule, and control the sending unit 103 to send bearer processing indication information to a GW-C if a rule matching result of the data packet meets a trigger condition for bearer processing, where the bearer processing indication information is used to trigger the GW-C to perform bearer processing according to quality of service QoS information of a data service corresponding to the data packet.

The sending unit 103 is configured to send the bearer processing indication information to the GW-C.

In an implementation of the present invention, the rule may be a correspondence between the data service and the QoS information, and the rule is locally configured by the GW-U or obtained by the GW-U from the GW-C.

The processing unit 102 finds, from the rule, QoS information required for the data service corresponding to the data packet, and determines that the trigger condition is that the QoS information required for the data service is inconsistent with QoS information of a current bearer that is currently used for transmitting the data service.

In the present invention, that the QoS information required for the data service is inconsistent with the QoS information of the current bearer that is currently used for transmitting the data service includes at least one of the following cases: an allocation/retention priority ARP required for the data service is inconsistent with an ARP of the current bearer that is currently used for transmitting the data service, or a QoS class identifier QCI required for the data service is inconsistent with a QoS QCI of the current bearer that is currently used for transmitting the data service.

In the present invention, the bearer processing indication information sent by the sending unit 103 may include the QoS information required for the data service. Alternatively, if each correspondence that is between a data service and QoS information and that is in the rule is corresponding to a rule identifier, the bearer processing indication information may include a rule identifier of a correspondence matching the data packet.

In another implementation of the present invention, the rule is a subscription event obtained by the GW-U from the GW-C, the subscription event includes type information description of a data service on which bearer processing needs to be performed, and the trigger condition is that the data packet matches the type information description.

In the present invention, the bearer processing indication information sent by the sending unit 103 may include an application identifier, and the application identifier is used to identify a data service type matching the data packet. Alternatively, if the type information description that is in the subscription event and that is of the data service on which bearer processing needs to be performed is corresponding to an event identifier, the bearer processing indication information sent by the sending unit 103 may include an event identifier corresponding to type information description matching the data packet.

In the present invention, the sending unit 103 is further configured to send packet feature information of the data packet to the GW-C, where the packet feature information is used by the GW-C to bind the data service corresponding to the data packet to a bearer.

The packet feature information is packet filtering information, and the packet filtering information includes some or all items of a service quintet of the data packet.

In the present invention, the receiving unit 101 is further configured to receive rule update indication information sent by the GW-C, where the rule update indication information includes modified rule content, a modified rule identifier, and a bearer processing manner corresponding to the modified rule.

The processing unit 102 is further configured to: update the rule according to the rule update indication information, and delete a data service processing result associated with the modified rule, where the data service processing result is a result obtained by processing, by the GW-U, a data service corresponding to a data packet that meets the trigger condition for bearer processing.

In the present invention, the receiving unit 101 is further configured to receive a traffic query request sent by the GW-C, where the traffic query request is used to instruct the GW-U to collect statistics about traffic of a specified bearer.

The processing unit 102 is further configured to: collect statistics about the traffic of the specified bearer according to the traffic query request, and send a statistical result to the GW-C.

In the present invention, the sending unit 103 is further configured to send end-of-data-service indication information to the GW-C.

It should be noted that, in a specific implementation process, the receiving unit 101 in the GW-U may be a receiver, the processing unit 102 may be a processor, and the sending unit 103 may be a transmitter. The receiver, the processor, and the transmitter may be connected by using a bus.

The receiver and the transmitter may be communications interfaces, and the like.

The processor may be a general purpose processor, including a central processing unit (CPU), a network processor (NP), and the like, or may be a digital signal processor (DSP), an application-specific integrated circuit (ASIC), a field programmable gate array (FPGA), another programmable logic device, or the like.

When the processor is a CPU, the GW-U may further include a memory that is configured to store a program. Specifically, the program may include program code, and the program code includes a computer operation instruction. The memory may include a random access memory (RAM), or may further include a nonvolatile memory such as at least one magnetic disk storage. The processor executes the program code stored in the memory, so as to implement the foregoing functions of the GW-U.

For details that are not described in this embodiment, refer to method description shown in FIG. 5 to FIG. 10. Details are not described herein.

In the present invention, the GW-U matches the received data packet with the rule, and sends the bearer processing indication information to the GW-C if the matching result meets the trigger condition for bearer processing, so as to trigger the GW-C to perform bearer processing, thereby resolving a problem that bearer processing is limited to a difference between UE capabilities of identifying a service flow.

Figure 3A:
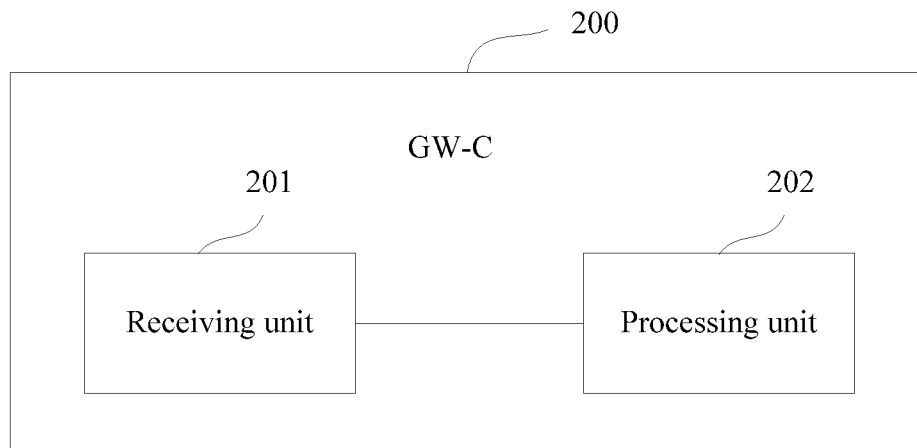
FIG. 3A and FIG. 3B are schematic structural diagrams of a GW-C according to an embodiment of the present invention.

The present invention provides a GW-C. FIG. 3A is a schematic structural diagram of the GW-C according to an embodiment of the present invention. In FIG. 3A, a reference sign 200 is used to represent the GW-C. As shown in FIG. 3A, the GW-C provided in the present invention includes a receiving unit 201 and a processing unit 202.

The receiving unit 201 receives bearer processing indication information sent by a GW-U, where the bearer processing indication information is used to instruct the GW-C to perform bearer processing according to quality of service QoS information of a data service corresponding to a data packet.

The processing unit 202 determines, according to the bearer processing indication information received by the receiving unit 201, the QoS information of the data service corresponding to the data packet, and performs bearer processing according to the QoS information of the data service corresponding to the data packet.

The performing bearer processing according to the QoS information of the data service corresponding to the data packet may be implemented in the following manner: determining whether QoS information of all bearers in an evolved packet core EPC includes QoS information consistent with the QoS information of the data service corresponding to the data packet; and if the QoS information of all the bearers in the evolved packet core includes the QoS information consistent with the QoS information of the data service corresponding to the data packet, updating a bearer corresponding to the QoS information that is consistent with the QoS information of the data service corresponding to the data packet, where QoS information of an updated bearer is consistent with the QoS information of the data service corresponding to the data packet; or if the QoS information of all the bearers in the evolved packet core does not include the QoS information consistent with the QoS information of the data service corresponding to the data packet, creating a dedicated bearer, where QoS information of the dedicated bearer is consistent with the QoS information of the data service corresponding to the data packet.

In the present invention, the bearer processing indication information received by the GW-C may include QoS information required for the data service corresponding to the data packet or a rule identifier of a correspondence matching the data packet.

Figure 3B:
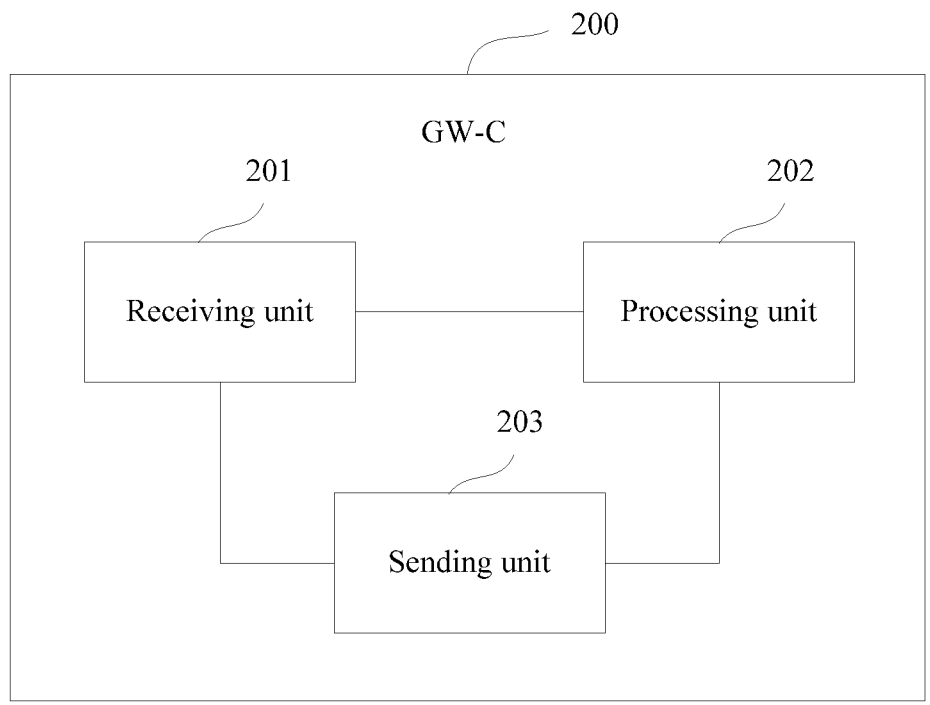

The GW-C further includes a sending unit 203. As shown in FIG. 3B, the sending unit 203 is configured to send a subscription event to the GW-U, where the subscription event includes type information description of a data service on which bearer processing needs to be performed.

The determining, according to the bearer processing indication information, the QoS information of the data service corresponding to the data packet includes: determining, by the GW-C according to the bearer processing indication information, a data service type corresponding to the data packet; and allocating, by the GW-C, QoS according to the data service type; or receiving, by the GW-C, QoS that is sent by another network element device and that is allocated according to the data service type, where the another network element device is a network element device that is in the evolved packet core EPC and that is different from the GW-U and the GW-C.

In the present invention, the bearer processing indication information received by the GW-C includes an application identifier, and the application identifier is used to identify a data service type matching the data packet. Therefore, the GW-C may determine the data service type of the data packet according to the application identifier included in the bearer processing indication information.

In the present invention, if the type information description that is in the subscription event and that is of the data service on which bearer processing needs to be performed is corresponding to an event identifier, the bearer processing indication information may include an event identifier corresponding to type information description matching the data packet. Correspondingly, the determining, by the GW-C according to the bearer processing indication information, a data service type corresponding to the data packet may be implemented in the following manner: determining, by the GW-C according to the event identifier, the type information description that is of the data service and that is corresponding to the event identifier, and determining, according to the type information description that is of the data service and that is corresponding to the event identifier, the data service type corresponding to the data packet.

In the present invention, the receiving unit 201 is further configured to receive packet feature information that is of the data packet and that is sent by the GW-U. The processing unit 202 is further configured to bind, according to the packet feature information, the data service corresponding to the data packet to a bearer.

The packet feature information is packet filtering information, and the packet filtering information includes some or all items of a service quintet of the data packet.

In the present invention, the GW-C includes the sending unit 203. The sending unit 203 is configured to send rule update indication information to the GW-U.

The rule update indication information includes modified rule content, a modified rule identifier, and a bearer processing manner corresponding to the modified rule.

With reference to the third aspect or any one of the foregoing implementations of the third aspect, in a fourth implementation, the GW-C includes the sending unit 203. The sending unit 203 is configured to send a traffic query request to the GW-U, where the traffic query request is used to instruct the GW-U to collect statistics about traffic of a specified bearer.

The receiving unit 201 is further configured to receive a statistical result obtained by collecting, by the GW-U, statistics about the traffic of the specified bearer according to the traffic query request.

The processing unit 202 is further configured to delete the specified bearer if it is determined, according to the statistical result, that accumulated traffic data of the specified bearer does not change at a specified time interval.

In the present invention, the receiving unit 201 is further configured to receive end-of-data-service indication information sent by the GW-U.

The processing unit 202 is further configured to remove a data service indicated by the end-of-data-service indication information from a traffic flow template TFT of a bearer.

In the present invention, the receiving unit 201 is further configured to receive QoS information of the deleted service flow. The processing unit 202 is further configured to update QoS information of a running bearer.

It should be noted that, in a specific implementation process, the receiving unit 201 in the GW-C may be a receiver, the processing unit 202 may be a processor, and the sending unit 203 may be a transmitter. The receiver, the processor, and the transmitter may be connected by using a bus.

The receiver and the transmitter may be communications interfaces, and the like.

The processor may be a general purpose processor, including a CPU, a NP, and the like, or may be a DSP, an ASIC, a FPGA, another programmable logic device, or the like.

When the processor is a CPU, the GW-C may further include a memory that is configured to store a program. Specifically, the program may include program code, and the program code includes a computer operation instruction. The memory may include a RAM, or may further include a nonvolatile memory such as at least one magnetic disk storage. The processor executes the program code stored in the memory, so as to implement the foregoing functions of the GW-C.

For details that are not described in this embodiment, refer to method description shown in FIG. 5 to FIG. 10. Details are not described herein.

The GW-C provided in the present invention receives the bearer processing indication information sent by the GW-U, and performs bearer processing according to the bearer processing indication information, thereby resolving a problem that bearer processing is limited to a difference between UE capabilities of identifying a service flow.

Figure 4:
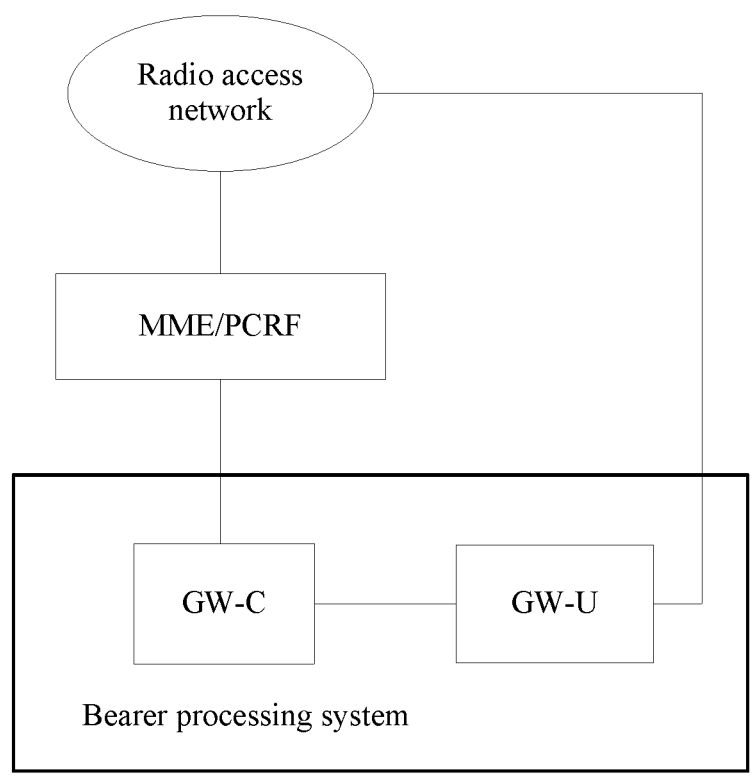
FIG. 4 is a schematic structural diagram of a bearer processing system according to an embodiment of the present invention.

The present invention further provides a bearer processing system. As shown in FIG. 4, the bearer processing system provided in the present invention includes a GW-C and a GW-U. The GW-U is configured to: receive a data packet and match the data packet with a rule, and send bearer processing indication information to the GW-C if a rule matching result of the data packet meets a trigger condition for bearer processing, where the bearer processing indication information is used to trigger the GW-C to perform bearer processing according to quality of service QoS information of a data service corresponding to the data packet. The GW-C is configured to: receive the bearer processing indication information sent by the GW-U, determine, according to the bearer processing indication information, the QoS information of the data service corresponding to the data packet, and perform bearer processing according to the QoS information of the data service corresponding to the data packet.

The GW-U in the bearer processing system provided in the present invention has a structure shown in FIG. 2, and may perform corresponding GW-U method functions in FIG. 5 to FIG. 10. The GW-C has a structure shown in FIG. 3, and may perform corresponding GW-C method functions in FIG. 5 to FIG. 10. Therefore, for details about the GW-C and the GW-U that are not described in the present invention, refer to related accompanying drawings and embodiment description. Details are not described herein.

The bearer processing method provided in the embodiments of the present invention is described in detail in the following embodiment of the present invention.

Figure 5:
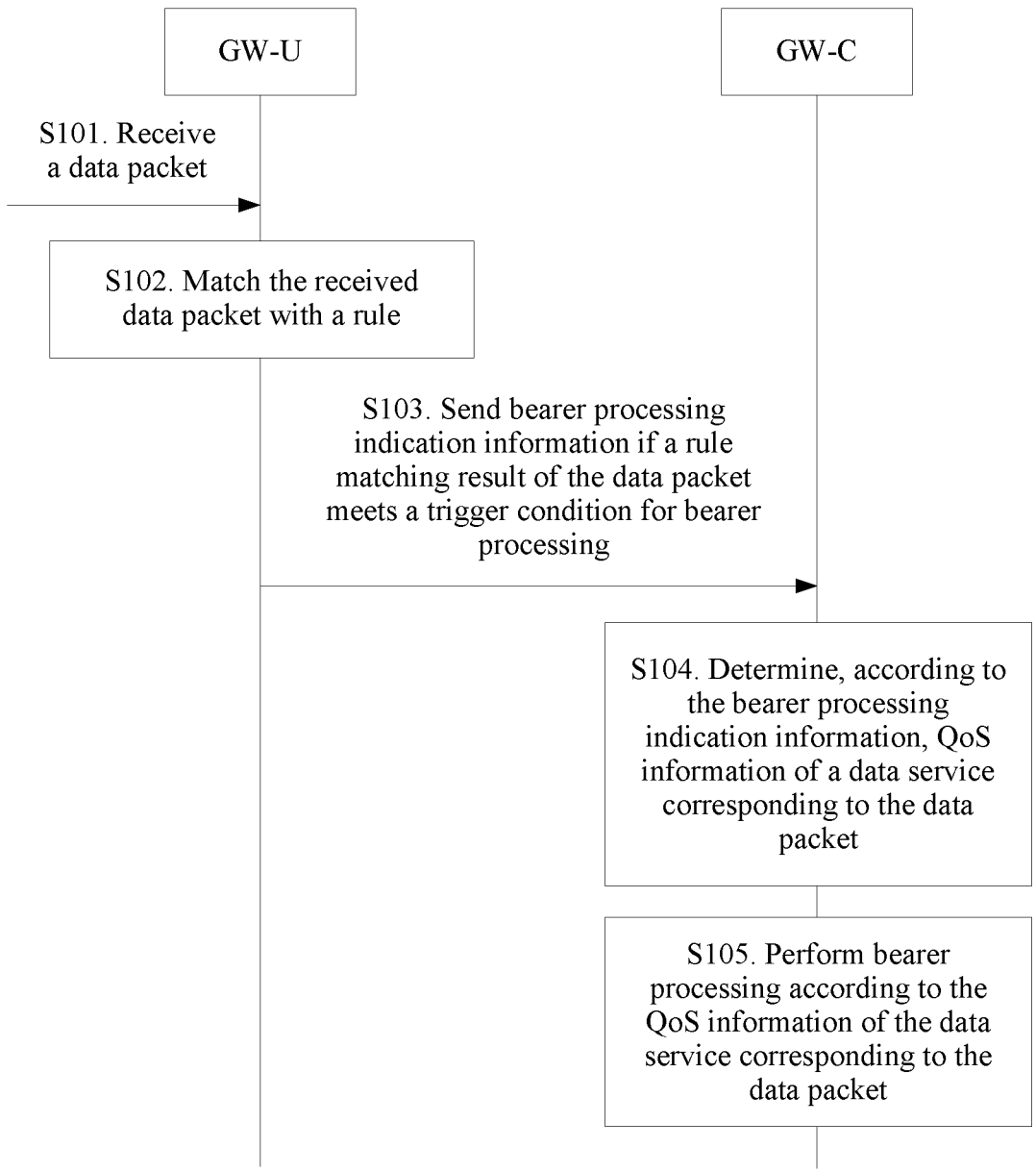
FIG. 5 is a flowchart for implementing a bearer processing method according to an embodiment of the present invention.

FIG. 5 is a flowchart for implementing a bearer processing method according to an embodiment of the present invention. As shown in FIG. 5, the method includes the following steps.

S101. A GW-U receives a data packet.

In this embodiment of the present invention, the data packet received by the GW-U may be an uplink data packet or a downlink data packet.

S102. The GW-U matches the received data packet with a rule.

In this embodiment of the present invention, the rule matched by the GW-U with the data packet may be locally configured by the GW-U or may be sent by a GW-C to the GW-U.

The rule in this embodiment of the present invention may be a correspondence between a data service and QoS information. For example, a rule description manner shown in the following Table 1 may be used.

TABLE 1

| Rule 1 | Data service 1 | QoS 1 |
| Rule 2 | Data service 2 | QoS 2 |
|        | Data service 3 | QoS 3 |
| Rule 3 | Data service 4 | QoS 4 |
| Rule 4 | Data service 5 | QoS 4 |

In Table 1, the rule 1, the rule 2, and the rule 3 may be understood as rule identifiers such as rule names or identities (ID). The data service 1, the data service 2, the data service 3, the data service 4, and the data service 5 may be understood as different data services. The QoS 1, the QoS 2, the QoS 3, and the QoS 4 may be understood as different QoS values. For example, a rule name is a first matching rule, a corresponding data service is a voice service, and QoS values required for the voice service are: a priority of 7, a packet delay budget of 100, and a packet error loss rate of $10^{-6}$.

In this embodiment of the present invention, one rule may include correspondences between QoS and one or more data services. For example, the rule 1 includes a correspondence between the data service 1 and the QoS 1, and the rule 2 includes a correspondence between the data service 2 and the QoS 2 and a correspondence between the data service 3 and the QoS 3. In this embodiment of the present invention, there may be a one-to-one mapping relationship between a data service and QoS. For example, QoS required for the data service 1 is the QoS 1. There may be further a many-to-one mapping relationship between a data service and QoS. For example, QoS required for the data service 4 is the QoS 4, and QoS required for the data service 5 is the QoS 4.

The GW-U finds, from the rule, QoS information required for a data service corresponding to the data packet, and determines whether the QoS information required for the data service is consistent with QoS information of a current bearer that is currently used for transmitting the data service. If the QoS information required for the data service is inconsistent with the QoS information of the current bearer that is currently used for transmitting the data service, a trigger condition for bearer processing is met.

Specifically, in this embodiment of the present invention, if an ARP included in the QoS information required for the data service is inconsistent with an ARP included in the QoS information of the current bearer that is currently used for transmitting the data service, and/or if a QCI included in the QoS information required for the data service is inconsistent with a QCI included in the QoS information of the current bearer that is currently used for transmitting the data service, it may be determined that the QoS information required for the data service is inconsistent with the QoS information of the current bearer that is currently used for transmitting the data service.

The rule in this embodiment of the present invention may be further a subscription event sent by the GW-C to the GW-U. The subscription event includes type information description of a data service on which bearer processing needs to be performed. For example, a manner shown in the following Table 2 may be used.

TABLE 2

| Event 1 | Type information description 1 of a data service | Application identifier 1 |
|         | Type information description 2 of a data service | Application identifier 2 |
| Event 2 | Type information description 3 of a data service | Application identifier 3 |
| Event 3 | Type information description 4 of a data service | Application identifier 4 |

In Table 2, the event 1, the event 2, and the event 3 may be understood as event identifiers such as event names or IDs. The event identifiers may be understood as the rule identifiers in Table 1 in the foregoing embodiment. The type information description of the data service may be understood as information such as a data packet feature that is used to match the data packet. The type information description of the data service may be understood as the data service in Table 1 in the foregoing embodiment. The application identifier is used to identify a data service type that is corresponding to type information description of a data service matching the application identifier. For example, the application identifier 1 is used to identify a data service type corresponding to the type information description 1 of the data service.

The GW-U determines whether the received data packet matches the type information description that is in the subscription event and that is of the data service. If the received data packet matches the type information description, the trigger condition for bearer processing is met.

S103. The GW-U sends bearer processing indication information to a GW-C if a rule matching result of the data packet meets a trigger condition for bearer processing, so as to trigger the GW-C to perform bearer processing according to quality of service QoS information of a data service corresponding to the data packet.

In this embodiment of the present invention, the bearer processing indication information sent by the GW-U to the GW-C is used to trigger the GW-C to perform bearer processing according to the quality of service QoS information of the data service corresponding to the data packet.

Specifically, in this embodiment of the present invention, the bearer processing indication information may include different content according to different rules. For example, if the rule is locally configured by the GW-U, the bearer processing indication information may include the QoS information required for the data service. Alternatively, if the rule is obtained by the GW-U from the GW-C, the bearer processing indication information may include a rule identifier matching the data packet. The rule identifier may be a rule name matching the data packet.

It should be noted that if the rule is obtained by the GW-U from the GW-C, the rule identifier sent by the GW-U to the GW-C is a rule identifier delivered by the GW-C to the GW-U or negotiated by the GW-C and the GW-U.

In the present invention, if the rule is the subscription event sent by the GW-C to the GW-U, the bearer processing indication information may include an application identifier. The application identifier is used to identify a data service type matching the data packet. Alternatively, the bearer processing indication information may include an event identifier. The event identifier is used to identify an event identifier corresponding to type information description that is of the data service and that matches the data packet.

Optionally, in this embodiment of the present invention, the bearer processing indication information sent by the GW-U to the GW-C may include packet feature information of the data packet, so as to bind a newly created dedicated bearer or an updated bearer to the data packet received by the GW-U. For example, in this embodiment of the present invention, the packet feature information may be packet filtering (packet filter) information. The packet filter information includes some or all items of a service quintet of the data packet.

In this embodiment of the present invention, the GW-U may send the packet filter information when deep packet inspection is performed on the data packet.

S104. The GW-C receives the bearer processing indication information sent by the GW-U, and determines, according to the bearer processing indication information sent by the GW-U, the QoS information of the data service corresponding to the data packet.

Specifically, in this embodiment of the present invention, if the bearer processing indication information includes QoS information of the data packet, the GW-C may directly obtain the QoS information of the data packet. Alternatively, if the bearer processing indication information includes a rule identifier of a correspondence matching the data packet, the GW-C may obtain QoS information of the data packet by parsing the rule identifier.

In this embodiment of the present invention, if the rule is the subscription event sent by the GW-C to the GW-U, the GW-C determines, according to the bearer processing indication information sent by the GW-U, the data service type corresponding to the data packet. The GW-C allocates QoS according to the data service type, or receives QoS that is sent by another network element device and that is allocated according to the data service type. The another network element device is a network element device that is in an evolved packet core (EPC) and that is different from the GW-U and the GW-C, for example, a PCRF.

In this embodiment of the present invention, if the bearer processing indication information includes an application identifier, a data service type matching the data packet may be directly determined according to the application identifier.

Type information description that is in the subscription event and that is of each data service on which bearer processing needs to be performed is corresponding to an event identifier such as an event name or a rule name. If the bearer processing indication information includes an event identifier, the GW-C determines, according to the event identifier, type information description that is corresponding to the event identifier and that is of a data service on which bearer processing needs to be performed, and determines, according to the type information description that is corresponding to the event identifier and that is of the data service on which bearer processing needs to be performed, the data service type corresponding to the data packet.

S105. The GW-C performs bearer processing according to the QoS information of the data service corresponding to the data packet.

In this embodiment of the present invention, the GW-C determines the QoS information of the data service corresponding to the data packet. Then, the GW-C determines whether QoS information of all bearers in the EPC includes QoS information consistent with the QoS information of the data service corresponding to the data packet.

If the QoS information of all the bearers in the EPC includes the QoS information consistent with the QoS information of the data service corresponding to the data packet, for example, the EPC includes an ARP and/or a QCI consistent with an ARP and/or a QCI of the data service corresponding to the data packet, the GW-C updates a bearer corresponding to the QoS information that is consistent with the QoS information of the data service corresponding to the data packet.

Alternatively, if the EPC does not include the QoS information consistent with the QoS information of the data service corresponding to the data packet, the GW-C creates a dedicated bearer. QoS information of the dedicated bearer is consistent with the QoS information of the data service corresponding to the data packet.

Optionally, in the present invention, the GW-C may receive the packet feature information sent by the GW-U. If the GW-C needs to create a new dedicated bearer, the GW-C generates a new traffic flow template (TFT) according to the packet feature information. Alternatively, if the GW-C needs to update an original bearer, the GW-C updates TFT information according to the packet feature information, so as to bind the data packet to the bearer.

According to the bearer processing method provided in this embodiment of the present invention, the GW-U matches the received data packet with the rule, and sends the bearer processing indication information to the GW-C if the matching result meets the trigger condition for bearer processing, so as to trigger the GW-C to perform bearer processing, thereby resolving a problem that bearer processing is limited to a difference between UE capabilities of identifying a service flow.

The bearer processing method in the foregoing embodiment is described in detail in the following embodiment of the present invention with reference to actual application.

Figure 6:
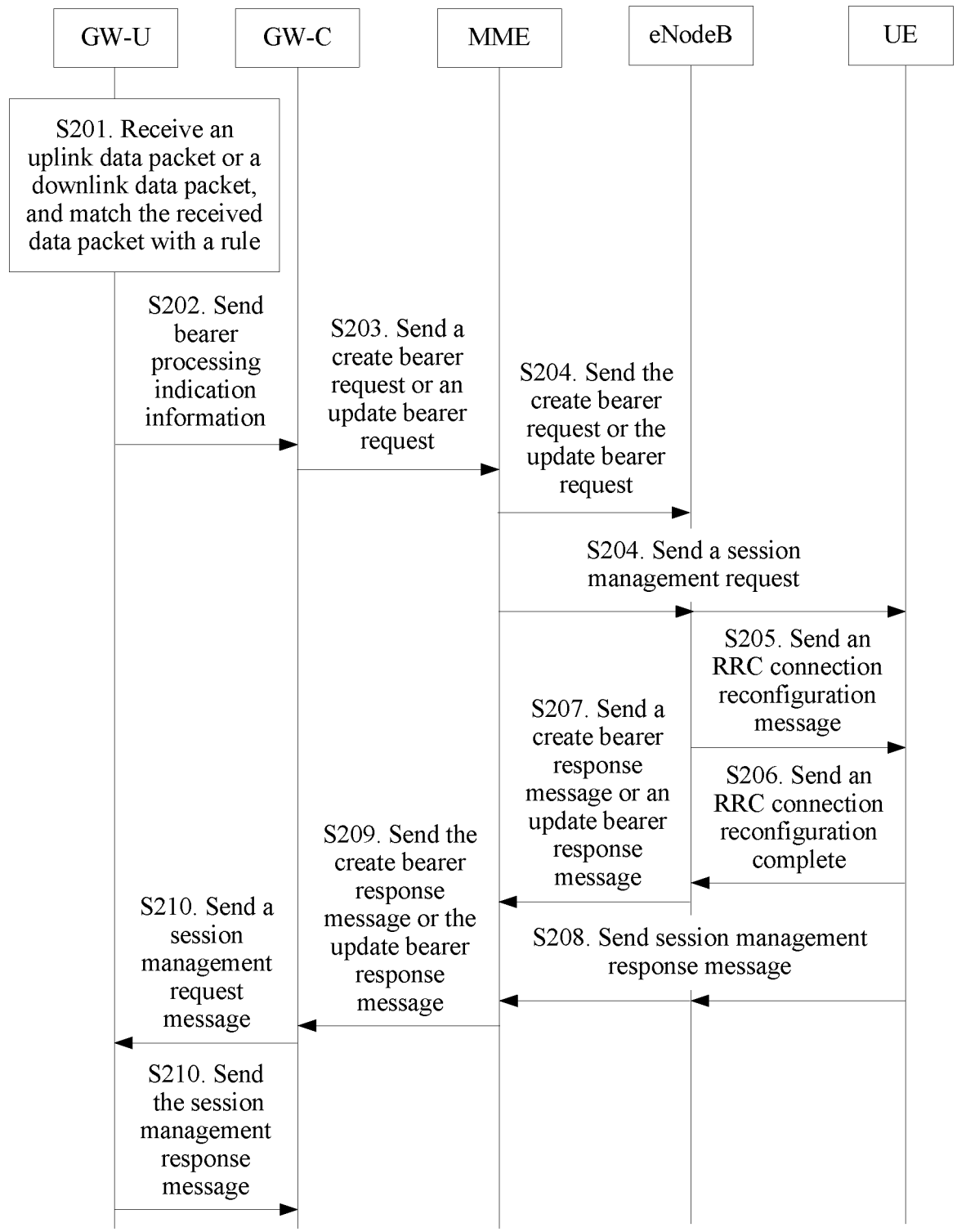
FIG. 6 is a schematic flowchart for implementing a bearer processing method according to an embodiment of the present invention.

In an embodiment of the present invention, an application scenario in which a GW-U matches a data packet with a local rule, and determines whether bearer processing needs to be performed on a data service corresponding to the data packet is used as an example for description. FIG. 6 is a schematic flowchart for implementing a bearer processing method according to this embodiment of the present invention. As shown in FIG. 6, the method includes the following steps.

S201. The GW-U receives an uplink data packet or a downlink data packet, and matches the received data packet with a rule.

In this embodiment of the present invention, the rule matched by the GW-U with the data packet may be locally configured by the GW-U or may be sent by a GW-C to the GW-U.

In this embodiment of the present invention, the rule is a correspondence between a data service and QoS information. For example, the rule may be the rule shown in Table 1 in the foregoing embodiment. The GW-U first matches the received data packet with a data service in the rule, and obtains corresponding QoS information. The GW-U compares the found QoS information with QoS information of a current bearer that is currently used for transmitting the data service, to determine whether QoS information required for the data service is consistent with the QoS information of the current bearer that is currently used for transmitting the data service. If the found QoS information is inconsistent with the QoS information of the current bearer, for example, at least one of a found ARP or QCI is inconsistent with at least one of an ARP or a QCI of the current bearer, the GW-U may determine that the QoS information required for the data service is inconsistent with the QoS information of the current bearer that is currently used for transmitting the data service, and a trigger condition for bearer processing is met.

S202. The GW-U sends bearer processing indication information to a GW-C.

In this embodiment of the present invention, the bearer processing indication information sent by the GW-U to the GW-C is used to trigger the GW-C to perform bearer processing according to the QoS information of the data service corresponding to the data packet.

In this embodiment of the present invention, the bearer processing indication information sent by the GW-U to the GW-C includes information that can enable the GW-C to obtain the QoS information required for the data service corresponding to the data packet. For example, the bearer processing indication information directly includes the QoS information required for the data service, or may certainly include a rule identifier of a correspondence matching the data packet, for example, a rule name.

S203. The GW-C sends a create bearer request or an update bearer request to an MME.

In this embodiment of the present invention, the GW-C obtains, according to the bearer processing indication information sent by the GW-U, the QoS information required for the data service, and compares the QoS information required for the data service with QoS information of all bearers in an EPC. For example, the GW-C compares a QCI in the QoS information required for the data service with QCIs of all the bearers in the EPC. If the QoS information of all the bearers in the EPC does not include QoS information consistent with the QoS information required for the data service, the GW-C sends the create bearer request to the MME, so as to create a dedicated bearer for the data service. Alternatively, if the EPC includes a bearer corresponding to QoS information that is consistent with the QoS information required for the data service, the GW-C sends the update bearer request to the MME, so as to add the data service to the bearer.

In this embodiment of the present invention, to bind a newly created dedicated bearer or an updated bearer to the data packet received by the GW-U, the bearer processing indication information sent by the GW-U to the GW-C may include packet feature information of the data packet, and the GW-C creates the new dedicated bearer or binds the data packet to an existing bearer according to the packet feature information. For specific implementation, refer to related descriptions in the foregoing embodiment. Details are not described herein again.

S204. The MME sends the create bearer request or the update bearer request to an eNodeB, and sends a session management request, and the eNodeB sends the session management request to UE.

S205. The eNodeB sends a radio resource control (RRC) connection reconfiguration message to the UE.

S206. The UE feeds back an RRC connection reconfiguration complete message to the eNodeB.

S207. The eNodeB sends a create bearer response message or an update bearer response message to the MME.

S208. The UE sends a session management response message to the eNodeB, and the eNodeB sends the session management response message to the MME.

S209. The MME sends the create bearer response message or the update bearer response message to the GW-C.

S210. The GW-C sends a session management request message to the GW-U, and controls the GW-U to update a corresponding user session, and the GW-U completes session update, and returns the session management response message to the GW-C.

In this embodiment of the present invention, the GW-U matches the received data packet with the rule, finds, from the rule, QoS information corresponding to a data service type, and determines whether the QoS information required for the data service is consistent with the QoS information of the current bearer that is currently used for transmitting the data service. If the QoS information required for the data service is inconsistent with the QoS information of the current bearer, the GW-U sends the bearer processing indication information to the GW-C. The GW-C performs bearer processing according to the bearer processing indication information, to complete bearer processing by means of interaction between the GW-U and the GW-C, and avoid a problem that bearer processing cannot be completed because of a UE capability difference.

Figure 7:
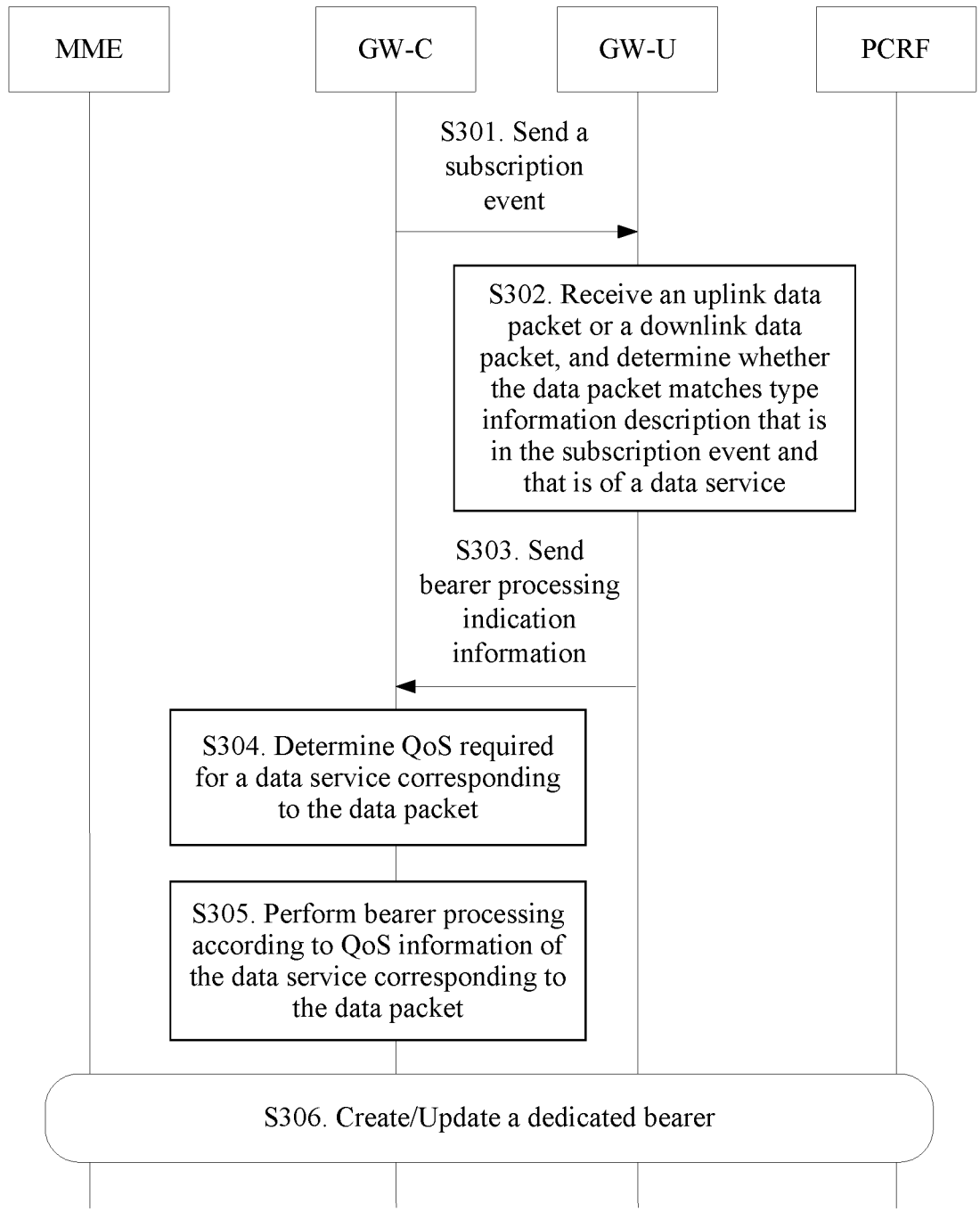
FIG. 7 is another schematic flowchart for implementing a bearer processing method according to an embodiment of the present invention.

In another embodiment of the present invention, an example in which a GW-C sends a subscription event to a GW-U, and the GW-C obtains a data service type corresponding to a data packet, and determines whether bearer processing needs to be performed on a data service corresponding to the data packet is used for description. The subscription event includes type information description of a data service on which bearer processing needs to be performed. FIG. 7 is a schematic flowchart for implementing a bearer processing method according to another embodiment of the present invention. As shown in FIG. 7, the method includes the following steps.

S301. The GW-C sends a subscription event to the GW-U.

In this embodiment of the present invention, the subscription event sent by the GW-C to the GW-U includes type information description of a data service on which bearer processing needs to be performed. In this embodiment of the present invention, the subscription event sent by the GW-C to the GW-U may be locally configured by the GW-C or may be triggered by another network element device. The another network element device is a network element device that is in an EPC and that is different from the GW-U and the GW-C, for example, a PCRF. The subscription event is generated by means of triggering of the another network element device. For example, the type information description that is in the subscription event and that is of the data service on which bearer processing needs to be performed may be generated based on a dynamic policy and charging control (PCC) rule or an application detection and control (ADC) rule sent by the PCRF.

S302. The GW-U receives an uplink data packet or a downlink data packet, and determines whether the data packet matches type information description that is in the subscription event and that is of a data service.

In this embodiment of the present invention, the GW-U determines whether the received uplink data packet or downlink data packet matches the type information description that is in the subscription event and that is of the data service. The GW-U may determine whether a data packet feature of the uplink data packet or the downlink data packet meets a requirement for a data service type described in the subscription event. If the data packet feature meets the requirement for the data service type described in the subscription event, the GW-U may determine that the data packet matches the type information description that is in the subscription event and that is of the data service. That is, a data service type corresponding to the received data packet is consistent with the data service type described in the subscription event. Then, the GW-U sends bearer processing indication information to the GW-C.

S303. The GW-C receives bearer processing indication information sent by the GW-U, and determines a data service type corresponding to the data packet.

In this embodiment of the present invention, the bearer processing indication information sent by the GW-U includes information that enables the GW-C to determine the data service type of the data packet received by the GW-U. For example, the bearer processing indication information includes an application identifier, and the application identifier is used to identify a data service type matching the data packet. The GW-C determines the data service type of the data packet according to the application identifier. In another example, the bearer processing indication information includes an event identifier. The event identifier is used to identify type information description that is of a data service and that matches the data packet. The GW-C determines, according to the event identifier, the type information description that is of the data service and that is corresponding to the event identifier. The GW-C determines, according to the type information description that is of the data service and that is corresponding to the event identifier, the data service type corresponding to the data packet.

S304. The GW-C determines QoS required for a data service corresponding to the data packet.

In this embodiment of the present invention, if the subscription event is locally configured by the GW-C, the GW-C allocates QoS according to the data service type. Alternatively, in this embodiment of the present invention, if the subscription event is triggered by the another network element device, the GW-C sends the bearer processing indication information to the another network element device, and receives QoS that is sent by the another network element device and that is allocated according to the data service type. In this embodiment of the present invention, the another network element device may be a network element device that is in the EPC and that is different from the GW-U and the GW-C, for example, the PCRF. For example, the GW-C may send an IP-connectivity access network (IP-CAN) session modification request message to the PCRF. The PCRF determines and allocates the QoS according to the data service type of the data packet, and feeds back an IP-CAN session modification reply to the GW-C.

S305. The GW-C performs bearer processing according to QoS information of the data service corresponding to the data packet.

In this embodiment of the present invention, the GW-C determines whether QoS information of all bearers in the EPC includes QoS information consistent with the QoS information of the data service corresponding to the data packet. If the QoS information of all the bearers in the EPC includes the QoS information consistent with the QoS information of the data service corresponding to the data packet, the GW-C updates a bearer corresponding to the QoS information that is consistent with the QoS information of the data service corresponding to the data packet. QoS information of an updated bearer is consistent with the QoS information of the data service corresponding to the data packet. Alternatively, if the QoS information of all the bearers in the EPC does not include the QoS information consistent with the QoS information of the data service corresponding to the data packet, the GW-C creates a dedicated bearer. QoS information of the dedicated bearer is consistent with the QoS information of the data service corresponding to the data packet.

S306. The GW-C triggers a procedure for creating or updating a dedicated bearer, and updates a user bearer of the GW-U and processing logic related to the user bearer. For a specific implementation procedure, refer to related descriptions in the foregoing embodiment. Details are not described herein again.

In this embodiment of the present invention, the GW-C sends the subscription event to the GW-U. The subscription event includes the type information description of the data service on which bearer processing needs to be performed. The GW-U matches the received data packet with a rule according to the subscription event. If the data packet feature of the data packet matches the type information description of the data service on which bearer processing needs to be performed, the GW-U sends the bearer processing indication information to the GW-C. The GW-C determines, according to the bearer processing indication information, the data service type that is corresponding to the data packet received by the GW-U, and determines QoS information of the data service type. The GW-C determines whether bearer processing needs to be performed, and performs bearer processing if bearer processing needs to be performed.

Optionally, in this embodiment of the present invention, the GW-C may further receive packet feature information that is of the data packet and that is sent by the GW-U, so as to bind, according to the packet feature information, the data service corresponding to the data packet to a bearer. The packet feature information may be packet filter information. The packet filter information includes some or all items of a service quintet of the data packet.

Figure 8:
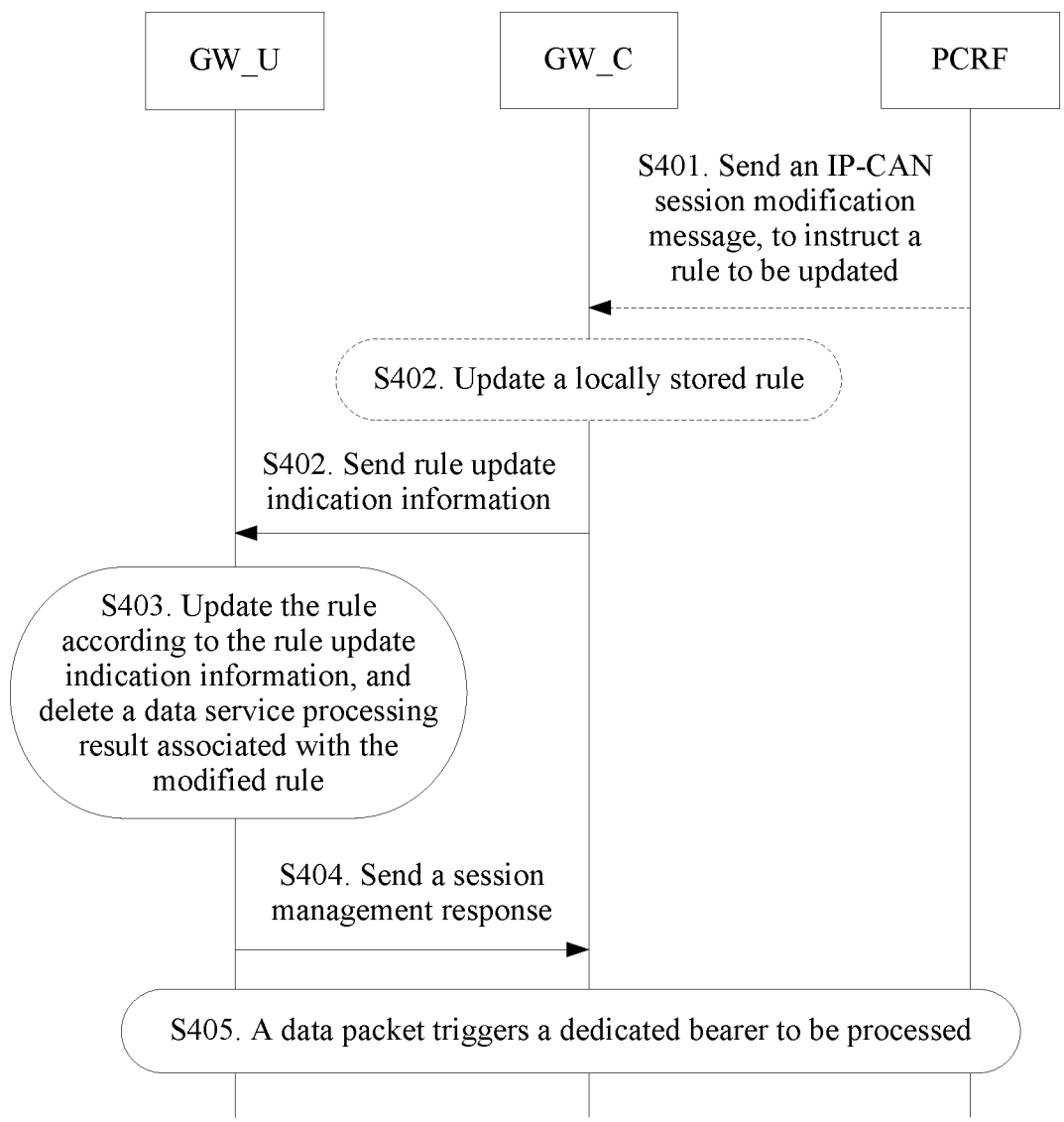
FIG. 8 is a flowchart for implementing a bearer processing method in a rule update case according to an embodiment of the present invention.

Further, if a matching rule is modified, a GW-U needs to update the rule and perform corresponding processing. In this embodiment of the present invention, an example in which a rule stored in a GW-C is modified is used for description. The rule stored in the GW-C may be modified by means of triggering of another network element device. For example, a PCRF modifies the stored rule by using an IP-CAN session modification message, or the GW-C may locally modify the stored rule in a statically predefined manner. In this embodiment of the present invention, an example in which the PCRF modifies the stored rule by using the IP-CAN session modification message is used below for description. As shown in FIG. 8, the following steps are included.

S401. The PCRF sends an IP-CAN session modification message to the GW-C, where the IP-CAN session modification message is used to instruct a rule to be updated.

S402. The GW-C sends rule update indication information to the GW-U, and synchronously updates a locally stored rule.

In this embodiment of the present invention, the rule update indication information sent by the GW-C to the GW-U includes a rule identifier and a rule processing method. The rule processing method includes: adding, modifying, or deleting a rule. If a rule is to be added or modified, the rule update indication information further includes new rule content.

In this embodiment of the present invention, the rule update indication information sent by the GW-C to the GW-U may be a session management request.

S403. The GW-U receives the rule update indication information sent by the GW-C, updates the rule according to the rule update indication information, and deletes a data service processing result associated with the modified rule.

In this embodiment of the present invention, the data service processing result is a result obtained by processing, by the GW-U, a data service corresponding to a data packet that meets a trigger condition for bearer processing. The data service processing result may be a flow table or a flow object. A subsequent data packet corresponding to the same data service may be directly matched with the data service processing result. If the data packet can match the data service processing result, the data packet does not need to be matched with the rule. Alternatively, if the data packet and the data service processing result cannot match, the data packet needs to be matched with the rule.

S404. The GW-U sends a session management response to the GW-C.

In this embodiment of the present invention, the GW-U updates the rule according to the rule update indication information sent by the GW-C, and deletes the data service processing result associated with the modified rule, so that a related data service can be matched with a rule again. That is, if the rule is modified, the related data service can be matched with a new rule, and creation or update of a bearer is triggered.

S405. A data packet triggers a dedicated bearer to be processed.

Figure 9:
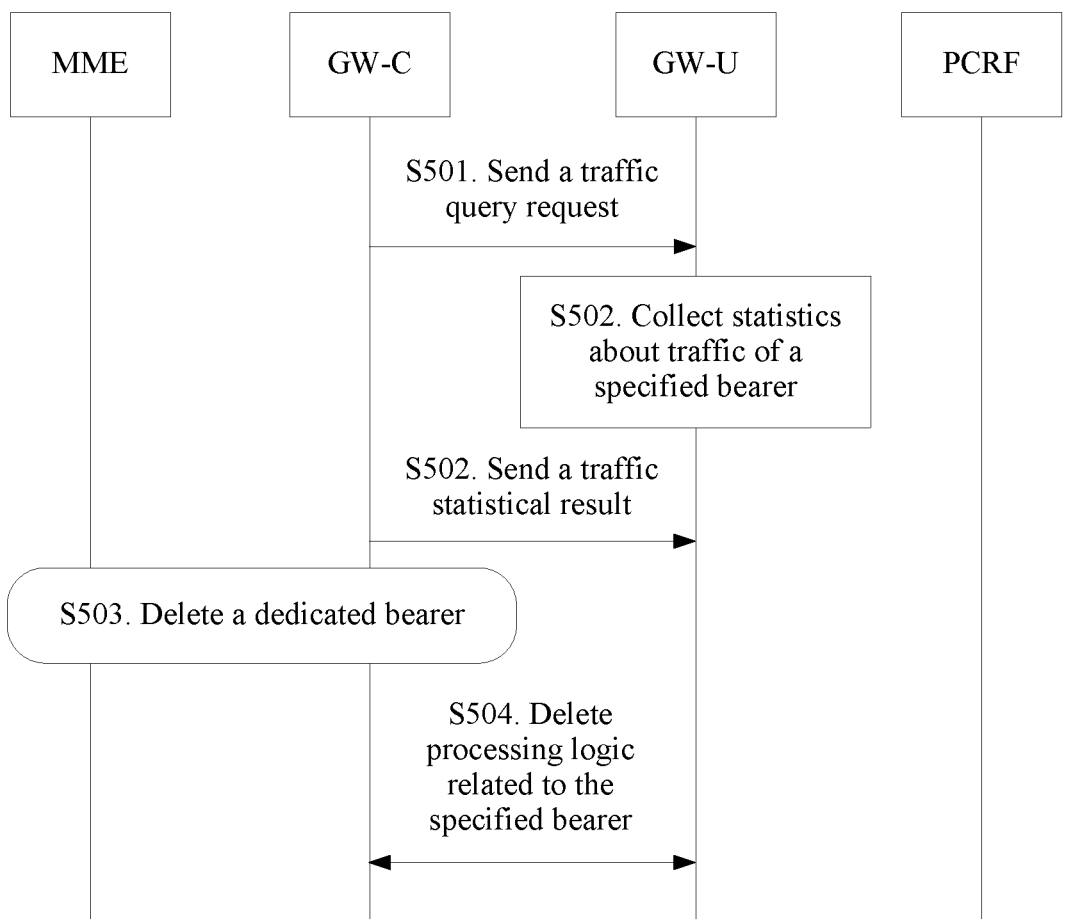
FIG. 9 is a flowchart for implementing bearer delete or update that is triggered after a data service ends according to an embodiment of the present invention.

In this embodiment of the present invention, a GW-C may send a traffic query request to a GW-U, so as to monitor a traffic status of a bearer, determine whether a data service ends, and trigger the bearer to be deleted or updated. As shown in FIG. 9, the following steps are included.

S501. The GW-C sends a traffic query request to the GW-U.

In this embodiment of the present invention, the traffic query request sent by the GW-C to the GW-U is used to instruct the GW-U to collect statistics about traffic of a specified bearer.

Specifically, in this embodiment of the present invention, the traffic query request sent by the GW-C may be indication information used for obtaining statistics about traffic in a timely manner, and the like, or may be indication information that includes a name type of a traffic statistics query request message of the bearer. Further, the traffic query request may further include a bearer identifier, for example, a bearer object ID, so as to collect statistics about the traffic of the specified bearer.

In this embodiment of the present invention, the GW-C may send the traffic query request to the GW-U at regular time intervals.

S502. The GW-U receives the traffic query request, collects statistics about traffic of a specified bearer according to the traffic query request, and sends a statistical result to the GW-C.

S503. The GW-C triggers, according to the statistical result, a procedure for deleting a dedicated bearer.

In this embodiment of the present invention, the GW-C may determine, according to the statistical result, whether the traffic of the specified bearer changes at a specified time interval. If the traffic does not change at the specified time interval, it is determined that the specified bearer does not transmit data at the specified time interval, and a trigger condition for deleting the dedicated bearer is met. The GW-C initiates the procedure for deleting the dedicated bearer. For the procedure initiated by the GW-C for deleting the dedicated bearer, refer to an existing procedure. This is not limited in the present invention.

It should be noted that the procedure initiated by the GW-C for deleting the dedicated bearer relates to network elements such as an MME, an eNodeB, and UE. In FIG. 9, some of the network elements are omitted.

S504. The GW-C interacts with the GW-U, and deletes processing logic related to the specified bearer.

In this embodiment of the present invention, the GW-C regularly sends the traffic query request to the GW-U. The GW-U collects statistics about the traffic of the specified bearer according to the traffic query request, and sends the statistical result to the GW-C. The GW-C determines a traffic change status of the specified bearer according to the statistical result, and deletes a corresponding dedicated bearer if the traffic does not change at the specified time interval.

Figure 10:
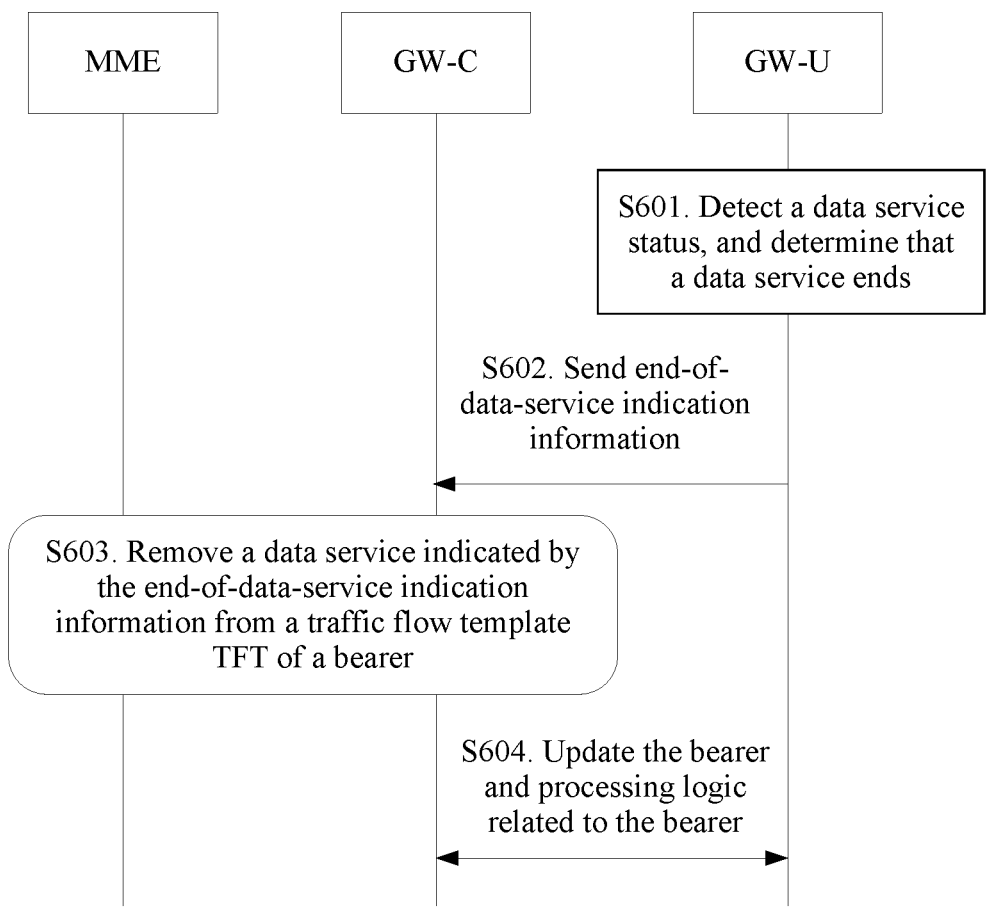
FIG. 10 is another flowchart for implementing bearer delete or update that is triggered after a data service ends according to an embodiment of the present invention.

In this embodiment of the present invention, if a GW-U determines that a data service ends, the GW-U may further interact with a GW-C, so as to delete or update a bearer. As shown in FIG. 10, the following steps are included.

S601. The GW-U detects a data service status, and determines that a data service ends.

In this embodiment of the present invention, the GW-U may determine whether the data service ends by detecting a service flow (a service data flow filter or an application detection filter) traffic feature, a data service packet feature, or the like. For example, if no traffic is generated at a specified time interval, the GW-U determines that the data service ends. If the GW-U detects a data packet feature indicating that the data service ends, for example, the GW-U detects an end-of-Transmission Control Protocol (TCP) packet, the GW-U may determine that the data service ends.

S602. The GW-U sends end-of-data-service indication information to the GW-C.

In this embodiment of the present invention, the GW-U may send the end-of-data-service indication information to the GW-C according to reporting indication information sent by the GW-C to the GW-U. The reporting indication information is used to instruct the GW-U to send the end-of-data-service indication information to the GW-C if the GW-U detects that the data service ends. The reporting indication information may be included in a rule or a subscription event sent by the GW-C to the GW-U.

In this embodiment of the present invention, the GW-U may further locally determine whether the end-of-data-service indication information needs to be sent to the GW-C. For example, if a bearer in which the data service is located is an Guaranteed Bit Rate (GBR) bearer, and the bearer includes another service different from the data service, the GW-U sends the end-of-data-service indication information to the GW-C if the GW-U detects that the data service ends.

Further, in this embodiment of the present invention, the end-of-data-service indication information includes data service description information. The data service description information may be specific service flow feature information such as packet filter, service data flow filter, or application detection filter. The data service description information may be further an identifier of a rule or a subscription event to which the data service is bound. The GW-C obtains the service flow feature information according to the identifier.

Further, in this embodiment of the present invention, the GW-U may include, in the end-of-data-service indication information, a bearer identifier of the bearer in which the data service is located, so that the GW-C determines corresponding bearer information according to the bearer identifier, and initiates bearer update to the bearer.

S603. The GW-C removes a data service indicated by the end-of-data-service indication information from a traffic flow template TFT of a bearer.

In this embodiment of the present invention, the GW-C deletes the data service indicated by the end-of-data-service indication information from the bearer. That is, the GW-C initiates a procedure for updating the bearer, so as to remove service flow feature information of the data service from the TFT, and generate new TFT information.

S604. The GW-C interacts with the GW-U, to update the bearer and processing logic related to the bearer.

Further, for the GBR bearer, the end-of-data-service indication information sent by the GW-U to the GW-C further includes QoS information of a deleted service flow. The QoS information of the deleted service flow is mainly bandwidth information. The GW-C obtains new QoS information of the bearer according to current QoS information of the bearer and the QoS information of the deleted service flow. The new QoS information is mainly bearer bandwidth information in the QoS information of the bearer.

In this embodiment of the present invention, the GW-U sends the end-of-data-service indication information to the GW-C, so that the GW-C determines a bearer for which a data service ends, and triggers the corresponding bearer to be updated.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A bearer processing method performed by a gateway user plane device, comprising:
   receiving a data packet of a service;
   determining a rule that matches the data packet, wherein the rule is associated with quality of service (QoS) information required for the service;
   determining whether the QoS information required for the service is consistent with QoS information of a first bearer that exists for transmitting the data packet of the service; and
   triggering, in response to the QoS information required for the service being inconsistent with the QoS information of the first bearer, a gateway control plane device to create a dedicated bearer that satisfies the QoS requirement for the service, wherein the gateway user plane device and the gateway control plane device are two separate devices in a core network.

2. The method according to claim 1, wherein the rule being associated with the QoS information required for the service comprises the rule being associated with a relationship between the service and the QoS information required for the service.

3. The method according to claim 1, wherein the rule is locally configured by the gateway user plane device.

4. The method according to claim 1, wherein the determining whether the QoS information required for the service is consistent with the QoS information of the first bearer comprises:
   determining whether allocation/retention priority (ARP) information required for the service is consistent with ARP information of the first bearer.

5. The method according to claim 1, wherein the determining whether the QoS information required for the service is consistent with the QoS information of the first bearer comprises:
   determining whether a QoS class identifier (QCI) required for the service is consistent with a QCI of the first bearer.

6. The method according to claim 1, wherein triggering the gateway control plane device to create the dedicated bearer comprises:
   sending the QoS information required for the service to the gateway control plane device.

7. The method according to claim 1, further comprising:
   interacting with the gateway control plane device to delete the dedicated bearer in response to the gateway user plane device determining that the service has ended.

8. The method according to claim 1, further comprising:
   interacting with the gateway control plane device to update the rule in response to the gateway user plane device determining to update the rule.

9. The method according to claim 1, further comprising:
   sending packet feature information of the data packet to the gateway control plane device, wherein the packet feature information comprises at least one item of a service quintet of the data packet.

10. A gateway user plane device, comprising:
    a transceiver, configured to receive a data packet of a service; and
    a processor, configured to:
       determine a rule that matches the data packet, wherein the rule is associated with quality of service (QoS) information required for the service;
       determine whether the QoS information required for the service is consistent with QoS information of a first bearer that exists for transmitting the data packet of the service; and
       trigger, in response to the QoS information required for the service being inconsistent with the QoS information of the first bearer, a gateway control plane device to create a dedicated bearer that satisfies the QoS requirement for the service, wherein the gateway user plane device and the gateway control plane device are two separate devices in a core network.

11. The gateway user plane device according to claim 10, wherein the rule being associated with the QoS information required for the service comprises the rule being associated with a relationship between the service and the QoS information required for the service.

12. The gateway user plane device according to claim 10, wherein the rule is locally configured by the gateway user plane device.

13. The gateway user plane device according to claim 10, wherein the processor being configured to determine whether the QoS information required for the service is consistent with the QoS information of the first bearer comprises the processor being configured to determine whether an allocation/retention priority (ARP) information required for the service is consistent with ARP information of the first bearer.

14. The gateway user plane device according to claim 10, wherein the processor being configured to determine whether the QoS information required for the service is consistent with the QoS information of the first bearer comprises the processor being configured to determine whether a QoS class identifier (QCI) required for the service is consistent with a QCI of the first bearer.

15. The gateway user plane device according to claim 10, wherein the transceiver is further configured to send the QoS information required for the service to the gateway control plane device.

16. The gateway user plane device according to claim 10, wherein the transceiver is further configured to interact with the gateway control plane device to delete the dedicated bearer in response to the gateway user plane device determining that the service has ended.

17. The gateway user plane device according to claim 10, wherein the transceiver is further configured to interact with the gateway control plane device to update the rule in response to the gateway user plane device determining to update the rule.

18. The gateway user plane device according to claim 10, wherein the transceiver is further configured to send packet feature information of the data packet to the gateway control plane device, wherein the packet feature information comprises at least one item of a service quintet of the data packet.

19. A non-transitory computer readable medium storing a program for execution by one or more processors of a gateway user plane device, the program including instructions to:
  receive, through a transceiver, a data packet of a service;
  determine a rule that matches the data packet, wherein the rule is associated with quality of service (QoS) information required for the service;
  determine whether the QoS information required for the service is consistent with QoS information of a first bearer that exists for transmitting the data packet of the service; and
  trigger, in response to that the QoS information required for the service being inconsistent with the QoS information of the first bearer, a gateway control plane device to create a dedicated bearer that satisfies the QoS requirement for the service, wherein the gateway user plane device and the gateway control plane device are two separate devices in a core network.

20. The non-transitory compute readable medium according to claim 19, wherein the rule being associated with the QoS information required for the service comprises the rule being associated with a relationship between the service and the QoS information required for the service; and
  wherein the instructions to determine whether the QoS information required for the service is consistent with the QoS information of the first bearer comprises instructions to perform at least one of:
    determine whether an allocation/retention priority (ARP) information required for the service is consistent with ARP information of the first bearer; or
    determine whether a QoS class identifier (QCI) required for the service is consistent with a QCI of the first bearer.

* * * * *